United States Patent [19]

Uchida et al.

[11] Patent Number: 4,827,115

[45] Date of Patent: May 2, 1989

[54] ID SYSTEM AND METHOD OR WRITING DATA IN AN ID SYSTEM

[75] Inventors: Yasuo Uchida, Takatsuki; Hisato Fujisaka, Kyoto, both of Japan

[73] Assignee: Omron Tateisi Electronics Co., Kyoto, Japan

[21] Appl. No.: 164,932

[22] Filed: Mar. 8, 1988

[30] Foreign Application Priority Data

Mar. 16, 1987 [JP] Japan ................................. 62-60573

[51] Int. Cl.$^4$ ........................................... G06K 19/06
[52] U.S. Cl. ..................................... 235/492; 235/380
[58] Field of Search ................................ 235/380, 492

[56] References Cited

U.S. PATENT DOCUMENTS 4,525,713 6/1985 Barletta ........................... 235/492 X Primary Examiner—Harold I. Pitts
Attorney, Agent, or Firm—Foley & Lardner, Schwartz, Jeffery, Schwaab, Mack, Blumenthal & Evans

[57] ABSTRACT

An ID system includes a data carrier attached to an article to be identified, and an ID controller capable of communicating with the data carrier. The data carrier is provided with first and second data buffers in addition to a readable/writable memory. Data to be written in the memory is temporarily written in the first data buffer. Old data at a location of the memory in which the aforementioned data is to be written is read out of the memory and temporarily stored in the second data buffer. Thereafter, the data in the first data buffer is written in the memory. In order to check whether the data has been written in the memory correctly, the written data is read out of the memory. In the event that a write error is detected in the checking operation, the old data of memory will have been preserved in the second data buffer, thereby enabling recovery of the old data.

3 Claims, 4 Drawing Sheets

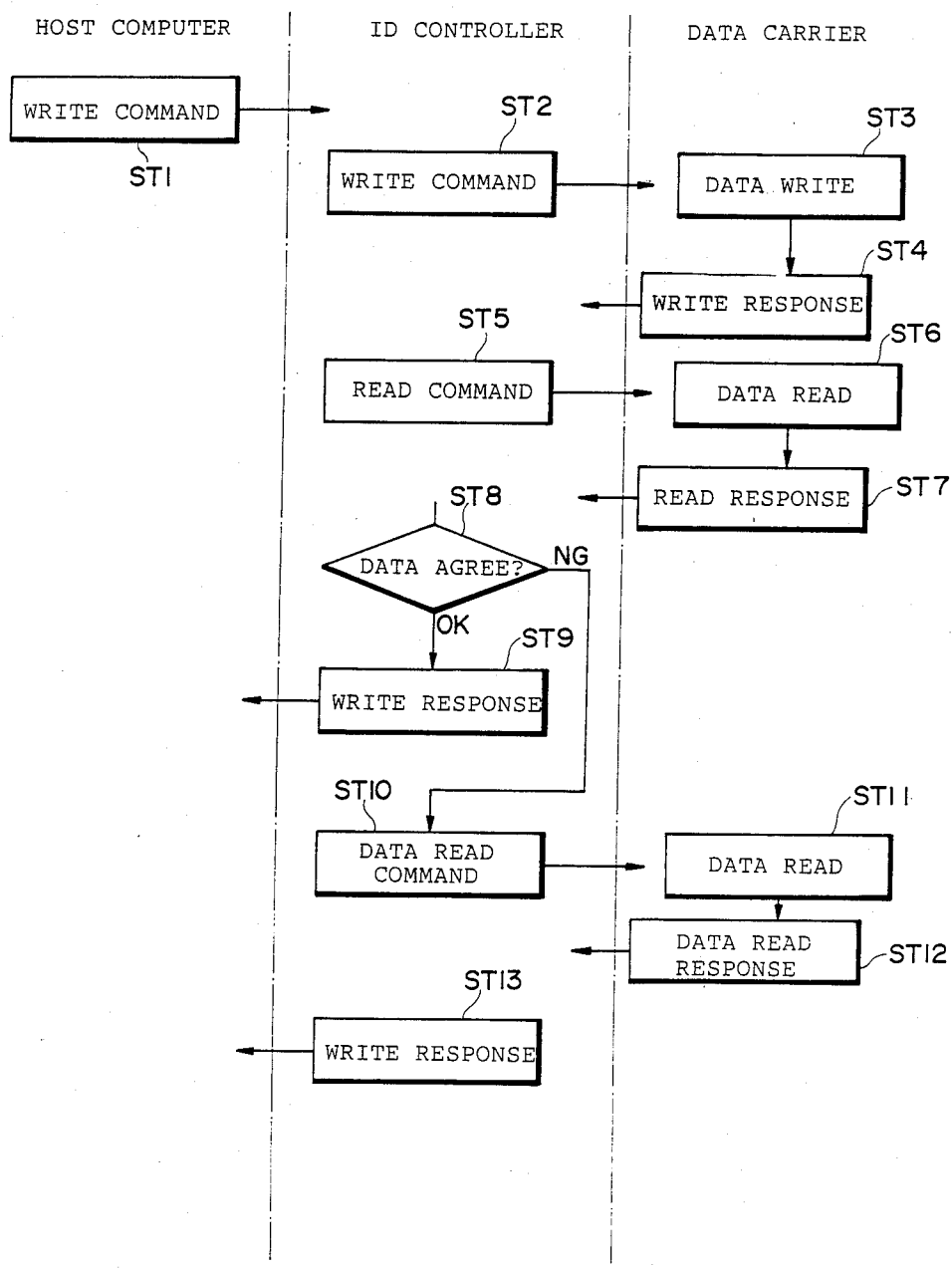

ID SYSTEM AND METHOD OR WRITING DATA IN AN ID SYSTEM

BACKGROUND OF THE INVENTION

This invention relates to a method of writing data in an ID (identification) system in which, under the control of a host computer, data from a second device such as an ID controller or the like is transmitted via transmission means to a first device such as a data carrier which includes a memory such as an EE PROM (electrically erasable programmable read-only memory) and is written in the memory, or data is read out of the memory and is transmitted from the first device to the second device via the transmission means.

ID systems are available for identifying the types of assembly parts, manufactured parts, semi-fabricated products delivered on a conveyor or the type of tool on a machine tool, by way of example. One type of such an ID system which has recently been considered employs data carrier elements affixed to these articles. Each data carrier contains a memory in which specific data from a controller can be written or from which data can be read.

In this conventonal ID system, each data carrier is assigned an identification code indicative of the article, tool or the like to which the carrier is attached, and extremely important data is stored in the memory of the data carrier. For instance, such data may relate to the length, diameter and offset of a tool, the cumulative utilization time thereof, tool lifetime, amount of wear, etc. Destruction of these data must be avoided at all cost. In particular, in the execution of processing for writing new data in the memory, sufficient care must be taken to avoid erasing the old data store in the memory. For example, if a data storage area is mistakenly addressed or if a write error occurs, the old data will be lost and cannot be restored. Above all, if the data is data relating to the total utilization time of a tool, such old data is impossible to recover once lost.

SUMMARY OF THE INVENTION

An object of the present invention is to provide a method and apparatus through which old data stored in the memory of a data carrier can be readily reproduced when an error occurs in the writing of new data in the memory.

In accordance with the present invention, a method of writing data in an ID system comprising a first device having an electrically readable/writable memory for holding data and attached to an article to be identified, and a second device capable of contactless communication with the first device, wherein the first device is provided with first and second temporary storage means in addition to the electrically readable/writable memory, the method comprising the following steps in the first device: receiving a write command and write data from the second device and, in response thereto, storing the received write data in the first temporary storage means, reading data out of the memory from a location thereof in which the write data is to be written and storing this read data in the second temporary storage means, and thereafter writing the write data stored in the first temporary storage means in the aforementioned location of the memory; and the following steps in the second device: sending a read command to the first device after sending the write command, thereby causing the data written in the memory by the foregoing write processing to be read out, receiving this read data, comparing this received data with write data preserved in the second device, outputting a normal write response if the two items of compared data agree, causing the first device to send the data stored in the second temporary storage means thereof to the second device if the two compared items of data fail to agree, and outputting the data of the second temporary storage means together with a response indicating non-agreement of the compared data.

An ID system in accordance with the present invention comprises a data carrier attached to an article to be identified, and an ID controller capable of communicating with the data carrier; the data carrier comprising: a data readable/writable memory, first and second temporary storage means, means responsive to a write command from the ID controller for storing write data received together with the write command in the first temporary storage means, reading old data out of the memory from a location thereof in which the write data is to be written and storing this old data in the second temporary storage means, and storing the stored data of the first temporary storage means in the aforementioned location of the memory, means responsive to a first read command from the ID controller for reading the data written in the memory by the foregoing processing out of the memory and sending the data to the ID controller, and means responsive to a second read command from the ID controller for reading out the old data stored in the second storate means and sending the old data to the ID controller; and the ID controller comprises: means for comparing the data sent from the data carrier responsive to the first read command with the write data held in the ID controller, and means for sending the second read command to the data carrier if the comparison indicates that the two compared items of data fail to agree.

Thus, in accordance with the invention, the first device, namely the data carrier, is provided with the first and second temporary storage means in addition to the memory. Data (new data) from the second device, namely the ID controller, sent to the data carrier to be written in the memory thereof is stored in the first storage means. Old data stored at a location of the memory where the new data is to be written is read out and preserved in the second temporary storage means. Accordingly, even if an error is made in the writing of the new data, the old data is preserved in the second temporary storage means and, hence, the recovery of the old data is possible. The old data in the second temporary storage means is sent to the ID controller and is stored in the ID controller or in a host computer which controls the ID controller. Thus, whenever necessary, old data can be written in the memory of a data carrier, old data can be written in the memory of another data carrier, or a host computer can execute processing using the old data.

Other features and advantages of the present invention will be apparent from the following description taken in conjunction with the accompanying drawings.

BRIEF DESCRIPTION OF THE DRAWINGS

FIG. 4 is a flowchart illustrating a data write operation in the ID system.

DESCRIPTION OF THE PREFERRED EMBODIMENT

An embodiment of the present invention will now be described in detail with reference to the drawings.

Figure 1:
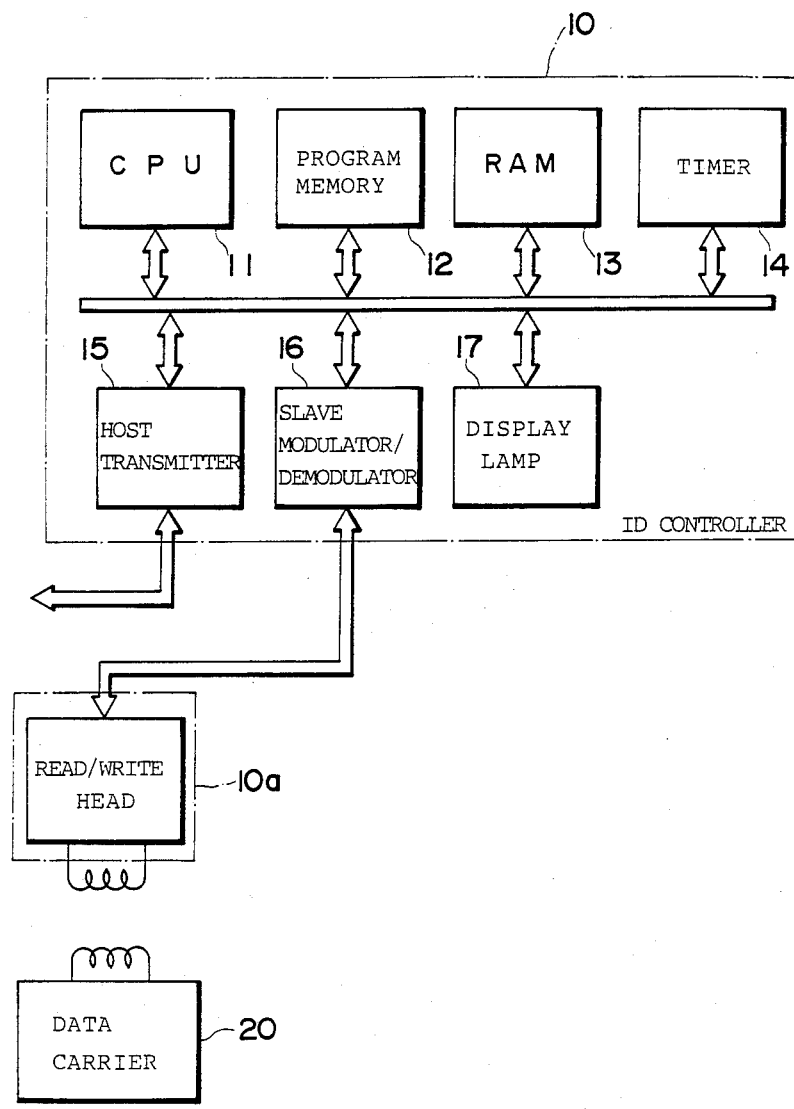
FIG. 1 is a block diagram illustrating the construction of an ID system, particularly an ID controller.

FIG. 1 is a block diagram illustrating an ID system embodying the present embodiment.

The ID system includes an ID controller 10 having a read/write head 10a, and a data carrier 20 supplied with electric power electromagnetically via the read/write head 10a and adapted to exchange data with the ID controller 10 electromagnetically via the head 10a.

The ID controller 10 includes a CPU 11, a program memory 12, a RAM 13, a timer 14 for timekeeping purposes, a host transmitter 15 for being connected to a host computer, a slave modulator/demodulator circuit 16 for exchanging commands and data with the data carrier 20 on the slave side, and display lamps 17 for displaying the status of operation. The ID controller 10 executes control for converting commands, data and the like from the host computer into commands, data and the like in a form capable of being transmitted to the data carrier 20 on the slave side.

Figure 2:
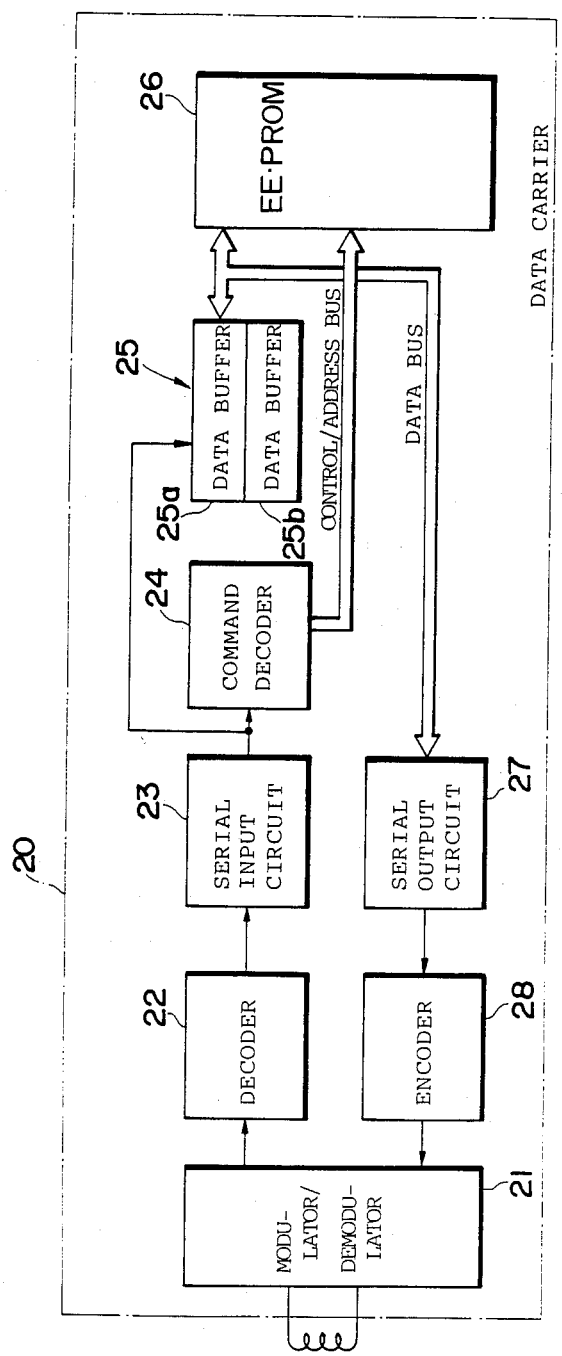
FIG. 2 is a block diagram illustrating the construction of a data carrier.

FIG. 2 is a block diagram illustrating the detailed construction of the data carrier 20. The data carrier 20 includes a modulator/demodulator circuit 21 electromagnetically coupled to the read/write head 10a of the ID controller 10, a decoding circuit 22 for decoding a signal received from the modulator/demodulator circuit 21, a serial input circuit 23, a command decoder 24 for decoding a command applied thereto, a data buffer 25, an EE PROM 26 in which data to be stored is written or from which data is read, a serial output circuit 27 used when data are read out of the EE PROM 26, and an encoding circuit 28 for encoding data to be transmitted before applying the data to the modulator/demodulator circuit 21. The data buffer 25 includes two RAM areas 25a (first temporary storage means) and 25b (second temporary storage means), each of which has a storage area for storing one page (eight bytes) of data in the EE PROM 26. Various data is written in and read from the EE PROM 26 in page units of eight bytes. The data carrier 20 does not possess an internal power supply circuit but is supplied with its operating power electromagnetically in contactless fashion from the ID controller 10 via the modulator/demodulator circuit 21. The power supply circuit of the ID controller 10 is not shown in the drawings.

Figure 3:
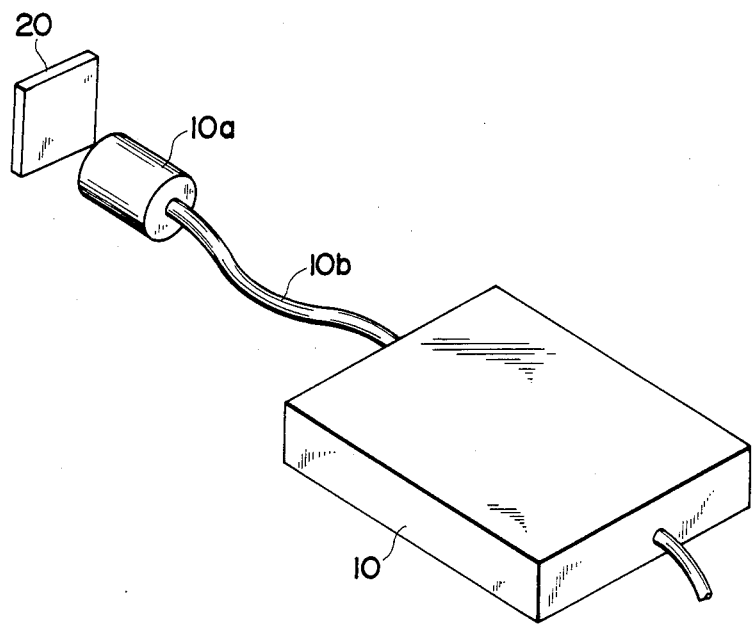
FIG. 3 is a perspective illustrating an example of the external appearance of an ID system.

FIG. 3 is an external view of the ID system of the illustrated embodiment. The read/write head 10a and the ID controller 10 are connected by a lead wire 10b. The data carrier 20 is composed of a single chip and is attached to an assembly part conveyed on a conveyor, a tool on a machine tool or a tool for an automatic tool changing apparatus or the like. When the data carrier 20 approaches or passes by the read/write head 10a during the conveyance of the article or tool, data is written in the data carrier 20 via the read/write head 10a or data from the data carrier 20 is read out to the ID controller 10 and host equipment via the read/write head 10a, this being performed under the control of the ID controller 10.

The operation for writing data from the ID controller to the data carrier in the ID system of this embodiment will now be described with reference to the flowchart of FIG. 4. The left column in FIG. 4 illustrates commands and the like from the host computer, the central column indicates processing performed by the ID controller 10, and the right column shows the processing performed by the data carrier 20.

First, a write command from the host computer is sent to the ID controller at a step ST1. The write command is composed of a command code, the starting address of the location of the EE PROM 26 at which data is to be written, and the write data (new data) to be written. The write command is preserved in the RAM 13 of the ID controller 10 for subsequent comparison processing. The write command is also transmitted to the data carrier 20 at a step ST2. The received command is decoded on the side of the data carrier 20, where the write data contained in the write command is stored in the first buffer 25a. The old data in the EE PROM 26 at the location where the write data is to be written is read out of the EE PROM 26 and stored in the second buffer 25b. Thereafter, the data stored in the first buffer 25a is written in the aforementioned location of the EE PROM 26 at a step ST3.

Ordinarily, the EE PROM 26 is adapted to store eight bytes in the form of one page and is written in page units at the time of a write operation. Accordingly, the old data read out of the one-page, eight-byte EE PROM 26 including the location in which the write data is to be written is actually stored in the second buffer 25b. Furthermore, in the first buffer 25a, prescribed data contained in the old data read out of the one-page, eight-byte EE PROM 26 is replaced by the new data and this eight-byte data is written collectively in the EE PROM.

In accordance with the invention, however, it will suffice if new write data sent by the ID controller is rewritten in memory. Therefore, it will suffice if the old data (even one word) that is to be written by the new write data is stored in the second buffer 25b.

When the writting of the new write data in the EE PROM 26 ends, the data carrier 20 sends a write response indicative of the end of the write operation back to the ID controller 10 at a step ST4. Upon receiving the write response, the ID controller 10 next transmits a read command to the ID controller 10 at a step ST5. Upon receiving the read command, the data carrier 20 reads the new write data, which was written in the EE EPROM 26 at the step ST3, out of the EE PROM at a step ST6, and transmits a read response to the ID controller 10 together with the new write data just read at a step ST7. As mentioned above, the write command inclusive of the new write data transmitted by the host computer has already been stored in the RAM 13 of the ID controller 10. The ID controller 10 now proceeds to compare the write data already stored in the RAM 13 prior to the write operation with the read data containing the read response from the data carrier 20 at a step ST8. If the compared data agree, the write operation is construe as being correct and the ID controller 10 transmits a write response to the host computer at a step ST9. If the compared data are found not to agree at the step ST8, on the other hand, namely if the write operation was not performed correctly, the ID controller 10 sends a data read command to the data carrier 20 at a step ST10.

Upon receiving the data read command, the data carrier 20 first reads one page of the old data, which has been read out of the EE PROM 26 and stored in the second buffer 25b, out of the second buffer 25b at a step ST11 and then sends this data back to the ID controller 10 together with the data read response at a step ST12. The ID controller 10 sends this data read response from the data carrier 20 back to the host computer as a write response at a step ST13.

Thus, as set forth above, the data carrier 20 is supplied with operating power only when it approaches the head 10a and is cut off from such power when it departs from the head 10a. In a case where the data buffer 25b is of the volatile type requiring a back-up power supply, the old data stored in the buffer 25b is erased when the the supply of power is cut off. In order to prevent this from occurring, the old data is sent from the data carrier 20 to the host computer via the ID controller 10, and the data is preserved in the host computer.

In a case where the host computer receives the write response together with the old data, the host computer construes this as meaning that the write operation just attempted was not performed normally and executes suitable processing, such as writing the data again at the same or a different address of the EE PROM 26 in data carrier 20. If the old data is the cumulative utilization time of a tool, for example, writing the old data in the data carrier 20 again is very meaningful. Specifically, cumulative utilization time is data which grows larger in successive fashion, so that there is very little difference between the immediately preceding item of this old data and the current item of new data. Accordingly, the old data can be written in the data carrier 20 in place of the current item of new data and can be treated as effective data without leading to substantial difficulties.

In accordance with the ID system of the present embodiment, the above-described outstanding effects can be achieved with little additional hardware, it being sufficent to add only the second data buffer 25b to the data carrier 20 in order to store data temporarily.

Though the ID controller 10 communicates with the data carrier 20 under the control of a host computer in the illustrated embodiment, the host computer is not absolutely essential and can be deleted.

As many apparently widely different embodiments of the present invention can be made without departing from the spirit and scope thereof, it is to be understood that the invention is not limited to the specific embodiments thereof except as defined in the appended claims.

What is claimed is:

1. A method of writing data in an ID system comprising a first device which has an electrically readable/writable memory for holding data and which is attached to an article to be identified, and a second device capable of contactless communication with said first device, wherein said first device is provided with first and second temporary storage means in addition to said electrically readable/writable memory, the method comprising the following steps performed in said first device:

receiving a write command and write data from said second device and, in response thereto, storing the received write data in said first temporary storage means;

reading data out of said memory from a location thereof in which the write data is to be written and storing this read data in said second temporary storage means; and thereafter writing the write data stored in said first temporary storage means in said location of said memory; and the following steps performed in said second device:

sending a read command to said first device after sending the write command, thereby causing the data written in said memory by the write processing to be read out;

receiving this read data;

comparing this received data with write data preserved in said second device;

outputting a normal write response if the two items of compared data agree;

causing said first device to send the data stored in said second temporary storage means thereof to said second device if the two items of compared data fail to agree; and outputting the data of said second temporary storage means together with a response indicating non-agreement of the compared data.

2. An ID system which comprises:

a data carrier attached to an article to be identified; and an ID controller capable of communicating with said data carrier;

said data carrier comprising:

a data readable/writable memory;

first and second temporary storage means;

means responsive to a write command from said ID controller for storing write data received together with the write command in said first temporary storage means, reading old data out of said memory from a location thereof in which the write data is to be written and storing this old data in said second temporary storage means, and storing the stored data of said first temporary storage means in said location of said memory;

means responsive to a first read command from said ID controller for reading the data written in said memory by the above processing out of said memory and sending the data to said ID controller; and means responsive to a second read command from said ID controller for reading out the old data stored in said second storage means and sending the old data to said ID controller; and said ID controller comprises:

means for comparing said data sent from the data carrier responsive to the first read command with the write data held in said ID controller; and means for sending the second read command to said data carrier if the comparison indicates that the two compared items of data fail to agree.

3. A data carrier attached to an article to be identified and capable of communicating with an ID controller, which comprises:

a data readable/writable memory;

first and second temporary storage means;

means responsive to a write command from said ID controller for storing write data received together with the write command in said first temporary storage means, reading old data out of said memory from a location thereof in which the write data is to be written and storing this old data in said second temporary storage means, and storing the stored data of said first temporary storage means in said location of said memory;

means responsive to a first read command from said ID controller for reading the data written in said memory by said processing out of said memory and sending the data to said ID controller; and means responsive to a second read command from said ID controller for reading out the old data stored in said second storage means and sending the old data to said ID controller.

* * * * *